US005719568A

United States Patent [19]

Adams

[11] Patent Number: 5,719,568
[45] Date of Patent: Feb. 17, 1998

[54] PERIMETER LIGHT SYSTEM

[76] Inventor: Peter J. Adams, 153 Woolf Rd., Milford, N.J. 08848

[21] Appl. No.: 563,310

[22] Filed: Nov. 28, 1995

[51] Int. Cl.$^6$ ............................................. G08G 5/04
[52] U.S. Cl. ...................... 340/961; 340/435; 340/932.2; 340/946; 340/958
[58] Field of Search ................................. 340/946, 431, 340/435, 961, 958, 932.2; 362/62; 356/5.01; 33/286; 116/28 R

[56] References Cited

U.S. PATENT DOCUMENTS

| | | | |
|---|---|---|---|
| 2,317,652 | 4/1943 | Toney | 340/932.2 |
| 2,522,637 | 9/1950 | Pripeton | 340/932.2 |
| 3,716,833 | 2/1973 | Roth | 340/904 |
| 3,749,197 | 7/1973 | Deutsch | 340/904 |
| 3,749,918 | 7/1973 | Jones | 340/904 |
| 4,066,890 | 1/1978 | Hamilton et al. | 340/946 |
| 4,348,652 | 9/1982 | Barnes et al. | 340/904 |
| 4,916,445 | 4/1990 | Crossley | 340/961 |

FOREIGN PATENT DOCUMENTS

| | | | |
|---|---|---|---|
| 3340687 | 5/1985 | Germany | 340/932.2 |

*Primary Examiner*—Brent A. Swarthout

[57] ABSTRACT

A device and process are disclosed for indicating clearance requirements of an aircraft maneuvering on a surface such as an apron, taxiway or flight deck. The device has an electromagnetic generation mechanism for generating a high intensity, low diffusing electromagnetic beam, and a projecting mechanism for securing the electromagnetic generation mechanism to the aircraft and projecting the beam toward a projection region. The projection region extends axially and in alignment with the distal end, and from the surface upward. In one embodiment, the electromagnetic generation mechanism is a laser that outputs a laser beam in the visible light spectrum. The beam produces an image upon the surface within the projection region, or upon an obstacle in the aircraft's path. Thus, the pilot can ascertain the clearance requirements by observing the projected images on the runway surface. Any object protruding within the space demarcated by the images represents an obstacle in the aircraft's path, and the pilot can alter course accordingly to avoid it.

15 Claims, 6 Drawing Sheets

5,719,568

PERIMETER LIGHT SYSTEM

BACKGROUND OF THE INVENTION

The invention relates generally to a guidance system for an aircraft, and more specifically to a device that provides a pilot with an indication of the aircraft's clearance requirements while taxiing. The need to determine an aircraft's clearance requirements arises whenever taxiing or maneuvering an aircraft in congested areas, which is common in airports and constant aboard ships. Nevertheless, determining the clearance requirements or perimeter bounds of an aircraft can be difficult for a pilot or whomever is maneuvering the aircraft. One reason for this difficultly is that the wings on many aircraft, especially on jets, are well behind a pilot's field of view. The pilot must therefore look behind, and then imagine the clearance requirements of the wings as the aircraft proceeds. This task is exacerbated by the length of the wings which reduces the pilot's depth perception. Thus, the pilot must not only imagine the clearance requirements ahead of him, but also base this judgement on inadequate depth perception. The pilot is often forced to estimate or even guess at his clearance requirements therefore risking damage to the wings, or needlessly altering course to insure that no collision occurs. These alternatives range from being dangerous to wasting time. A need therefore exists for a device that allows a person maneuvering an aircraft to ascertain its clearance requirements quickly and accurately. The present invention fulfills this need.

SUMMARY OF THE PRESENT INVENTION

The present invention provides a device that indicates the clearance requirements of an aircraft maneuvering on a surface such as an apron, taxiway or flight deck. The device has an electromagnetic generation mechanism for generating a high intensity, low diffusing electromagnetic beam, and a projecting mechanism for securing the electromagnetic generation mechanism to the aircraft and projecting the beam toward a projection region. The projection region corresponds to the clearance requirement of the distal ends of the wings, and extends from the surface upward. In one embodiment, the electromagnetic generation mechanism is a laser that outputs a laser beam in the visible light spectrum. The beam produces an image upon the surface within the projection region, or upon an obstacle in the aircraft's path. Thus, the pilot can ascertain the clearance requirements by simply observing the images on the tarmac surface. Any object protruding within the space demarcated by the images represents an obstacle in the aircraft's path, and the pilot can alter course accordingly to avoid it.

The following objects, features and advantages are met by one or more embodiments of the present invention:

It is an object of the invention to provide a device having means of generating a beam of high intensity energy and means of projecting the beam along the path of the aircraft to provide an indication of the aircraft's clearance requirements.

It is a feature of the invention that the beam may be a laser beam in the visible light spectrum that is projected such that an image is formed upon the surface indicating the aircraft's clearance requirements, or upon an obstacle in the aircraft's path.

It is an advantage of the present invention that a device is provided that aids in maneuvering an aircraft on a surface by providing an indication of the aircraft's path or clearance requirements.

These and other objects, features and advantages of the invention will be apparent to those skilled in the art upon consideration of the following description of the invention.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

Figure 1:
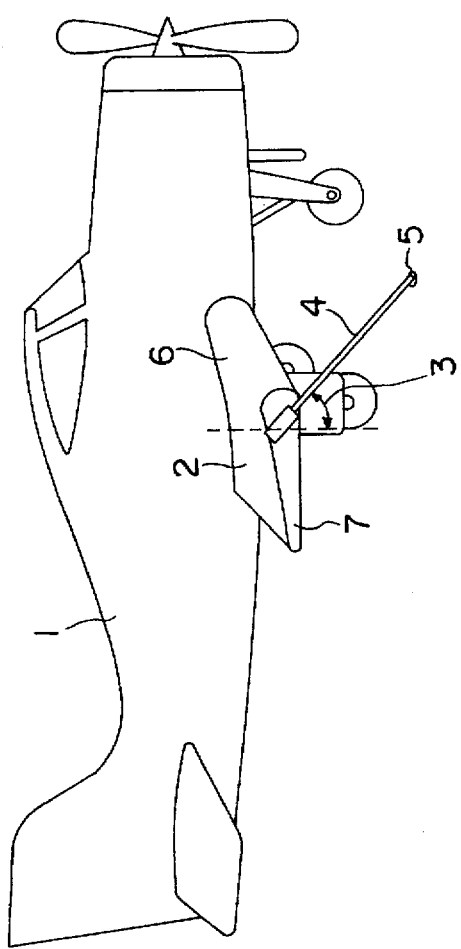
FIG. 1 shows a perspective view of an airplane having the perimeter indication system.
Figure 2:
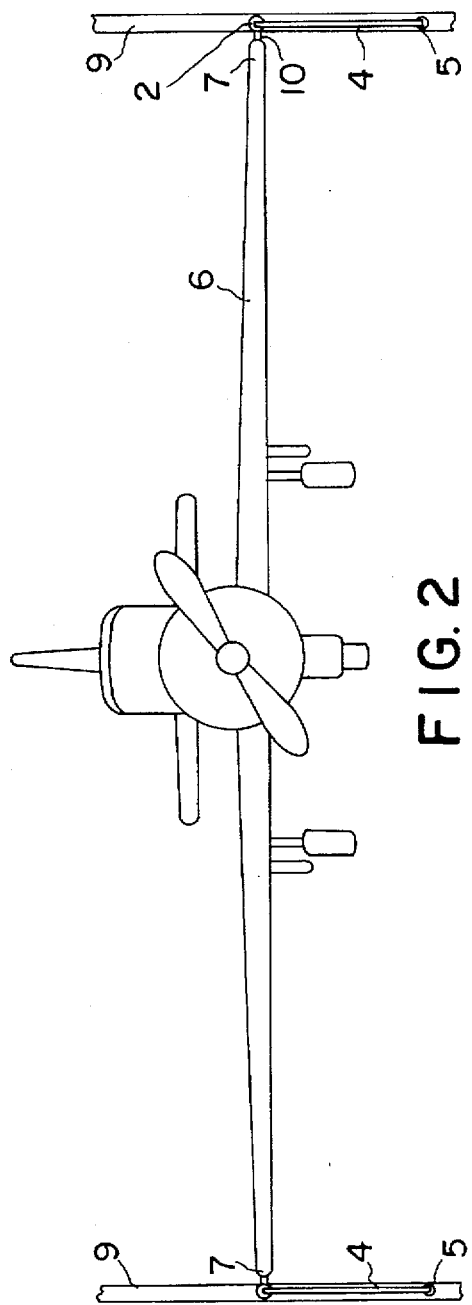
FIG. 2 shows a front view of the airplane in FIG. 1.
Figure 3:
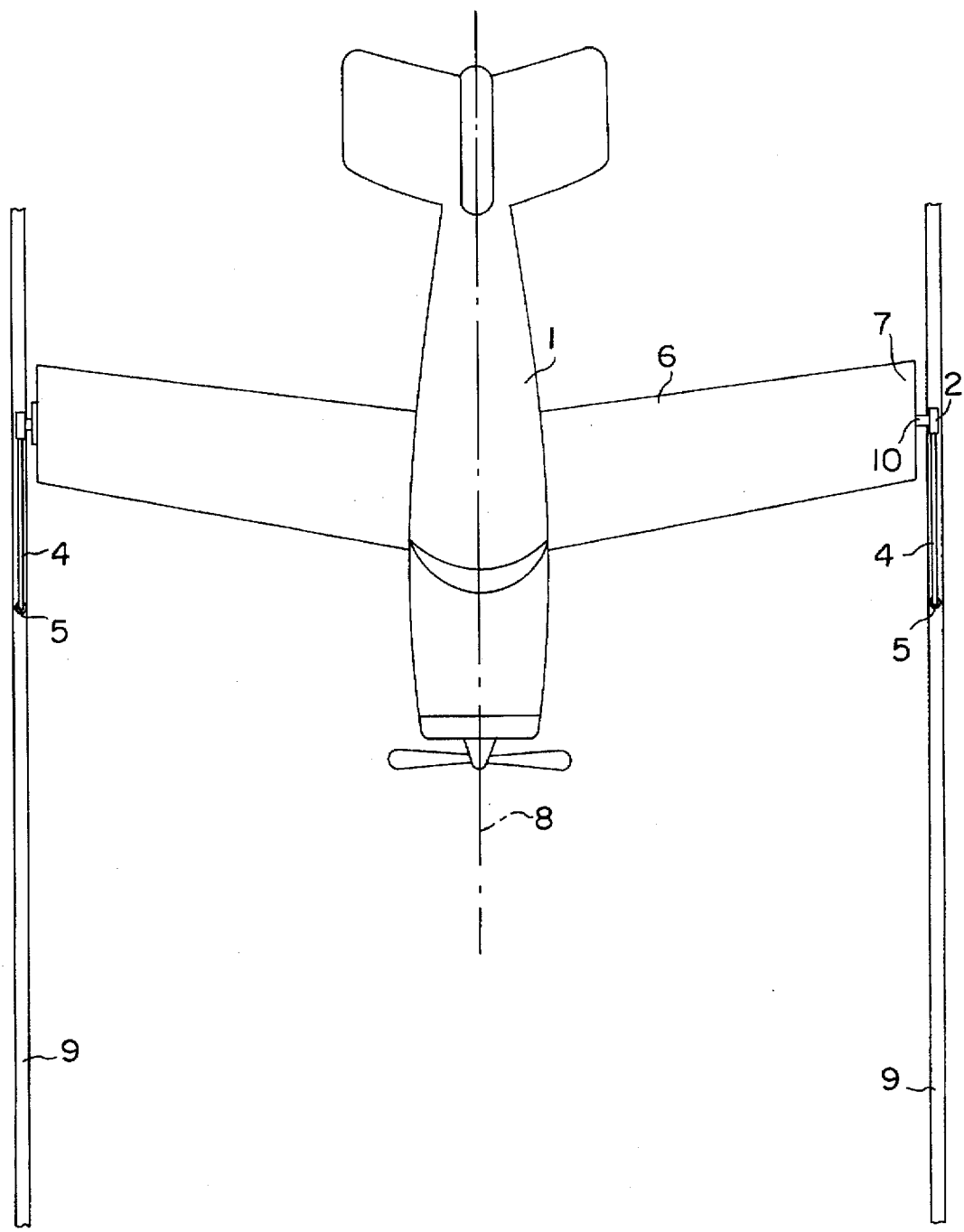
FIG. 3 shows a top view of the airplane in FIG. 1.
Figure 9:
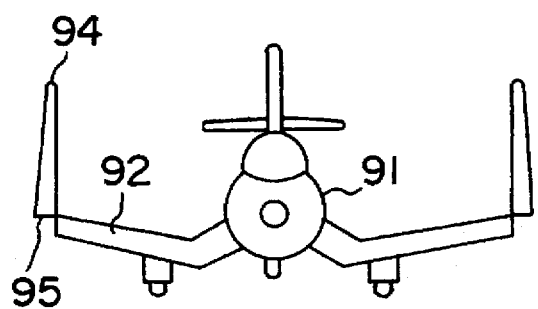
FIG. 9 shows a jet with its wings folded.

The present invention aids in maneuvering an aircraft on a surface by providing an indication of the aircraft's path or clearance requirements. Aircraft in this context refers to craft with fixed wings, folding wings, or rotating wings or blades as found in a traditional airplane, a carrier jet or a helicopter respectively. As shown in FIGS. 1–3, a traditional airplane 1 has wings 6 with distal ends 7, and a linear axis 8. Since the distal ends 7 represent the aircraft's widest point, if the path requirements of the distal ends 7 are determined, so follows the clearance requirements of the entire aircraft. The present invention recognizes this, and uses an electromagnetic beam to project the path requirements of the distal ends 7. It should be understood that the distal end in this context refers to the most outboard end of the wing when maneuvering. Therefore, in an aircraft 91 with folding wings 92, as shown in FIG. 9, the distal end may be located at the wing tip 94 and/or the hinge 95, since the most distal portion depends upon whether the wing is folded. In a helicopter 81, the wing's distal end—or rather the blade's distal end 82—has a circular clearance requirement about the vehicle when rotating.

FIGS. 1, 2 and 3 show the invention as a device comprising an electromagnetic generation means 2 for generating a high intensity, low diffusion beam 4, and projecting means 10 for projecting the beam 4 in a projection region 9. In the airplane embodiment of the invention, the projection region extends axially and in alignment with the distal end 7, and from the surface upward. One preferred embodiment projects a visible light beam 4 toward the projection region 9 such that an image 5 is formed upon the runway or tarmac within the projection region 9, or upon an obstacle in the aircraft's path. Thus, the pilot can ascertain the clearance requirements by simply observing the images on the runway surface. Any object protruding within the space demarcated by the images represents an obstacle in the aircraft's path, and the pilot can alter course accordingly to avoid it.

The electromagnetic generation means 2 and the beam 4 generated may assume a variety of different embodiments.

For example, the beam may be in either the visible or nonvisible light spectrum. In the visible light spectrum, a high intensity, low diffusion light beam is preferred to produce a sharp image in both day and night over a significant distance. For this reason, a traditional laser is the preferred electromagnetic generation means. It should be understood, however, that other possible visible light sources exist, such as a high intensity strobe light or a spot light. Suitable nonvisible electromagnetic beams include infrared and certain laser frequencies. These nonvisible beams may be used in conjunction with alarm means (described below) or other circuitry to interpret reflective data from the beams.

The projecting means 10 secures the electromagnetic generation means 2 to the aircraft 1 using traditional and well known techniques and mechanisms. Suitable configurations include mounting the electromagnetic generation means either internally or externally to the distal end of the wing, or on the aircraft's body. In this disclosure, external projecting means are depicted for demonstrative purposes, although in practice internal projecting means may be preferred to reduce windage. Additionally, the projecting means may be configured to secure the electromagnetic generation means to preexisting as well as new aircraft.

Figure 6:
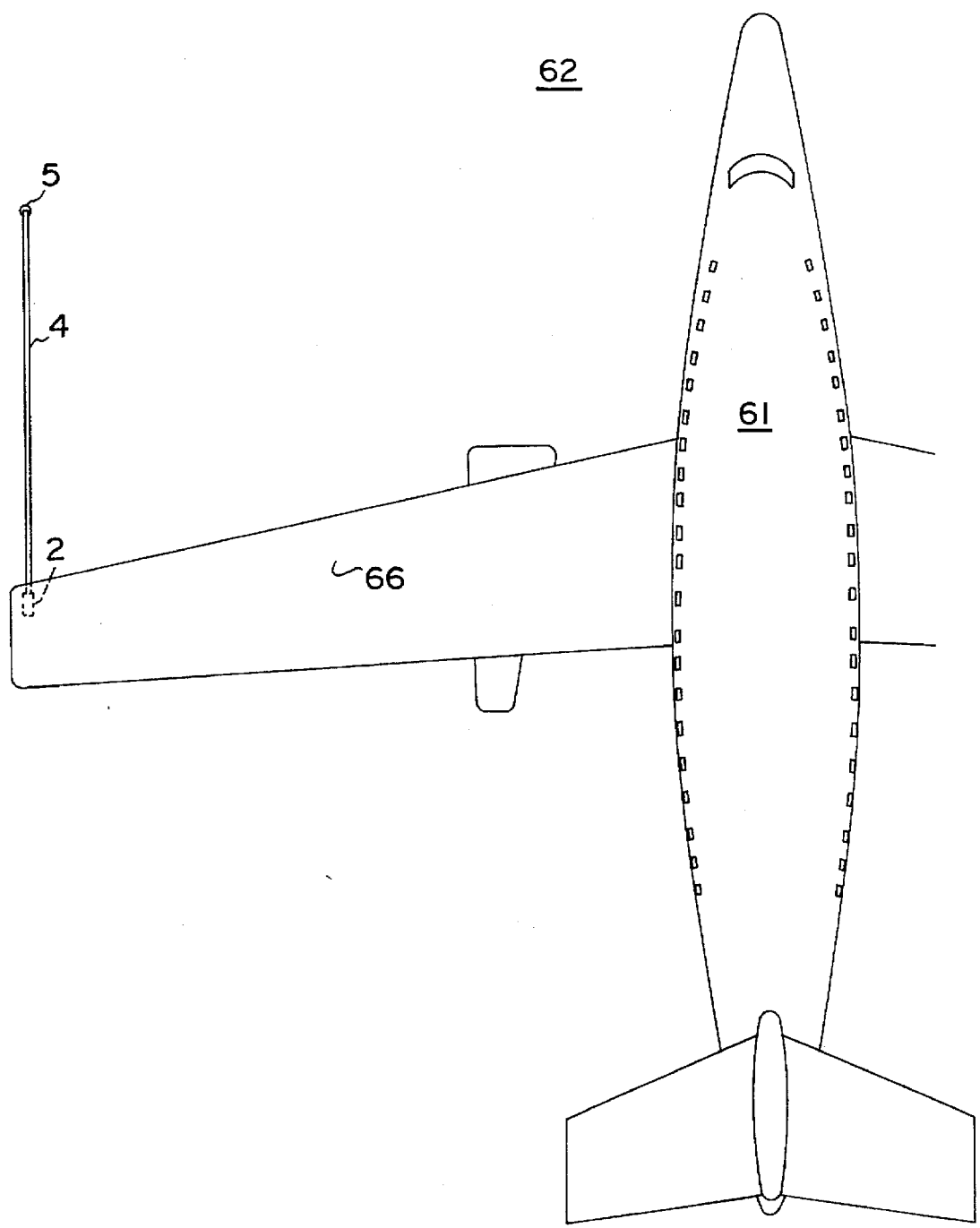
FIG. 6 shows a jet with swept back wings and an internal wing mounted perimeter indication system.
Figure 7A:
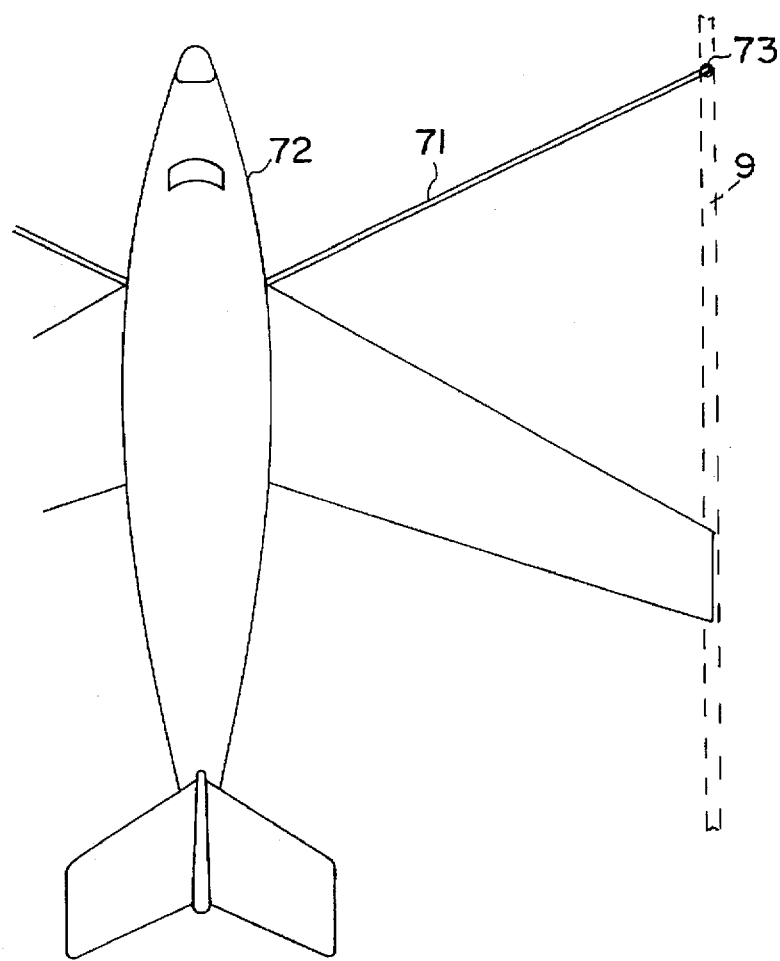
FIGS. 7A and 7B show a jet with the perimeter indication system mounted to the fuselage.
Figure 7B:
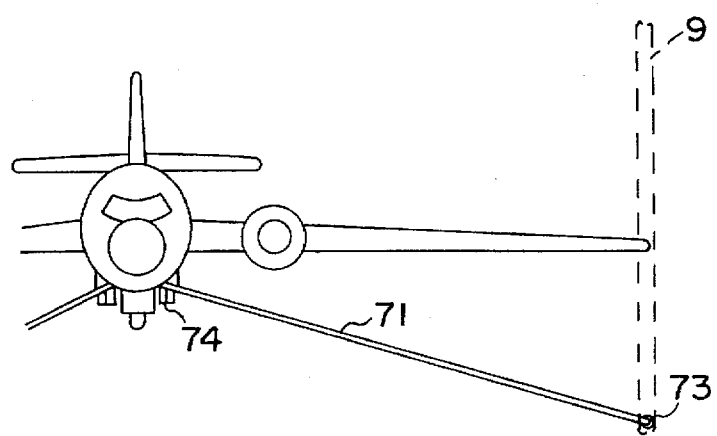

The projecting means not only secures the electromagnetic generation means to the aircraft, but also directs the electromagnetic beam. The electromagnetic beam may be directed in a variety of ways to provide an indication of the aircraft's clearance or path requirements within the projection region 9. In FIGS. 1 and 2, the electromagnetic generation means is mounted to the distal end 7 of the wing 6, and the beam 4 projects at a downward projection angle 3 forward of vertical such that an image 5 appears in the projection region 9 in front of the wing. FIGS. 7a and 7b show another embodiment where the electromagnetic generation means 74 is mounted on the body 72 of the plane and the beam 71 is projected at an outward and downward projection angles. The outward and downward angles of the beam are set such that an image 73 is formed on the runway surface within the projection region 9. Both these embodiments provide the operator of the aircraft, or whoever may be maneuvering it, with an advanced indication of the aircraft's clearance requirements. Such forward projection is particularly important with a jet 61 which has swept back wings 66 that are often behind the operator's field of view 62 as shown in FIG. 6. If the image forms on an obstacle or if the operator determines that an obstacle protrudes within the space demarcated by the image, then he or she can alter the aircraft's course accordingly.

Figure 8:
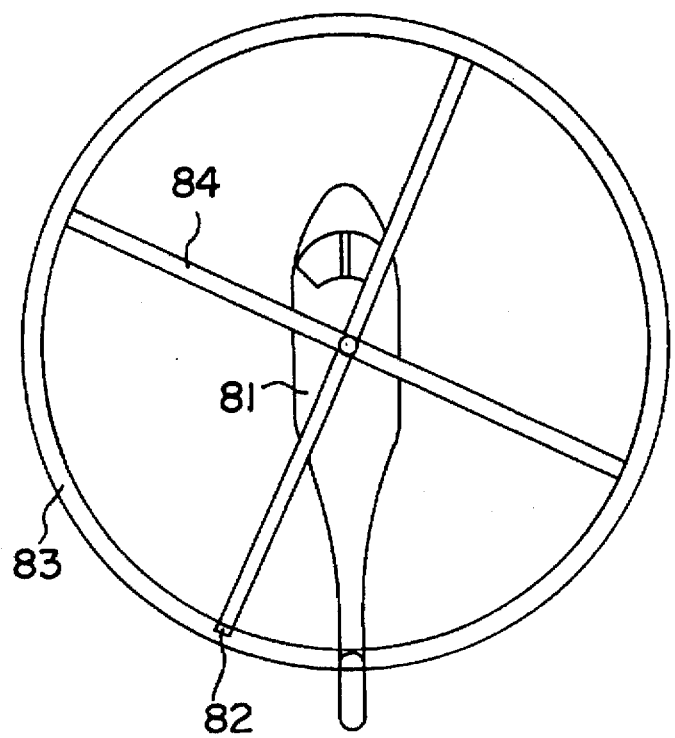
FIG. 8 shows a top view of a helicopter with a circular projection region demarcating its rotor blade clearance requirements.

FIG. 8 shows another embodiment of the invention wherein the projection region 83 demarcates the clearance requirements of the blades 84 of a helicopter 81. Unlike the fixed wing embodiment, the projection region 83 in this case is circular. To project the beam in this fashion, a laser may be positioned to direct its beam toward reflectors in the rotor. The reflectors in turn reflect the beam toward the surface. The rotating action of the rotor may be exploited to rotate the reflectors such that a circular pattern is produced upon the surface. Alternatively, the projection region may be based upon the widest clearance requirements of the helicopter— i.e., when the blade is abeam. In this case, a linear projection region as used in fixed wing aircraft may be used as described above.

Figure 4:
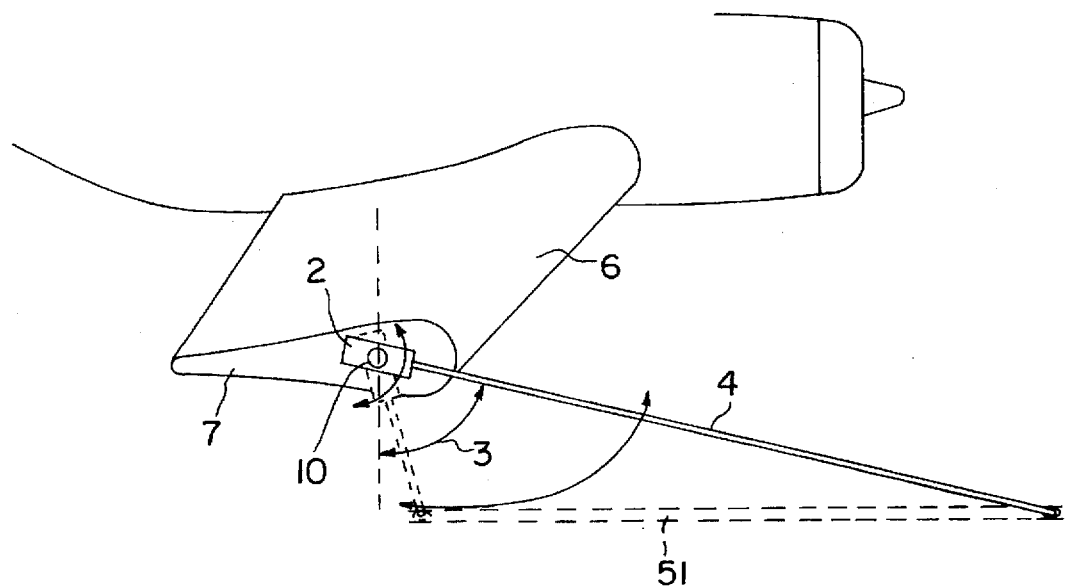
FIG. 4 shows a detailed view of the electromagnetic generation means and the projection means having oscillation means.
Figure 5:
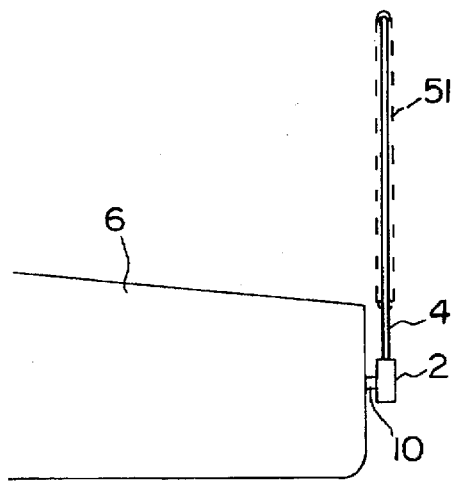
FIG. 5 shows a virtual line that is produced by the oscillating beam of FIG. 4.

In anther embodiment shown in FIGS. 4 and 5, the projecting means 10 also comprises actuating means. The actuating means may be either manual, in which the user controls the actuation, or automatic, in which a machine controls it. The actuating means is operatively connected to the electromagnetic generation means 2 and moves it such that the beam 4 is moved along the projection region 9. Having control over the projection angle 3 offers several advantages. For example, if the actuating means is automatic, the electromagnetic beam 4 may be oscillated or rotated at a frequency or RPM sufficient to produce a virtual line 51 as shown in FIG. 5, rather than a single point. The line 51 provides the user with a clearer indication of the aircraft's path requirements. Alternatively, if the actuating means is manually controlled, the beam 4 may be raised or lowered within the projection region to determine whether a particular object will present a problem. For example, as a pilot taxies down a narrow corridor, he may move the beam toward an object he believes may be in the aircraft's path. If the beam produces an image on the object, the pilot will realize that it does indeed represent an obstacle and he can adjust course accordingly.

The device may also comprise alarm means operatively connected to the electromagnetic generation means for monitoring the beam and triggering an alarm if the electromagnetic beam encounters an obstacle. Such devices are based on the reflective properties of the electromagnetic wave and are well known in the art, especially in regard to security systems and robotics. The alarm means may operate in both the visible and nonvisible electromagnetic spectrums.

Obviously, numerous modifications and variations of the present invention are possible in light of the above teachings. It is therefore understood that within the scope of the appended claims, the invention may be practiced otherwise than as specifically described herein.

What is claimed is:

1. A device for indicating clearance requirements of an aircraft maneuvering on a surface, said aircraft having a linear axis and wings, each wing having a distal end, said device comprising:

electromagnetic generation means for generating a high intensity, low diffusing electromagnetic beam, wherein said electromagnetic beam is in the visible light spectrum such that the beam produces a visible image upon an object within its path, and wherein said electromagnetic beam is a laser; and projecting means for securing said electromagnetic generation means to said aircraft and projecting said beam toward a projection region at a downward projection angle forward of vertical such that the beam contacts the ground at a position indicating the location of the distal end of a wing said projection region corresponding to the clearance requirements of said distal end and extending from said surface upward.

2. The device of claim 1, wherein said projecting means comprises:

automatic actuating means operatively connected to said electromagnetic generation means for actuating said beam in said projection region at a sufficient frequency to produce a virtual line image within said projection region.

3. The device of claim 1, wherein said projecting means comprises:

manual actuating means operatively connected to said electromagnetic generation means to enable the user to move said beam to produce an image within said projection region.

4. The device of claim 1, wherein said projection means secures said electromagnetic generation means inboard of said distal end, and projects said beam at an outward and downward projection angle.

5. The device of claim 1, wherein said aircraft is a helicopter and said projection region encircles said helicopter.

6. A device for indicating clearance requirements of an aircraft maneuvering on a surface, said aircraft having a linear axis and wings, each wing having a distal end, said device comprising:

electromagnetic generation means for generating a high intensity, low diffusing electromagnetic beam;

projecting means for securing said electromagnetic generation means to said aircraft and projecting said beam toward a projection region, said projection region corresponding to the clearance requirements of said distal end and extending from said surface upward; and automatic actuating means operatively connected to said electromagnetic generation means for actuating said beam in said projection region at a sufficient frequency to produce a virtual line image within said projection region.

7. The device of claim 6, wherein said electromagnetic beam is a laser.

8. The device of claim 1, wherein said projection means secures said laser near said distal end, and projects said beam at a downward projection angle forward of vertical.

9. The device of claim 1, wherein said projection means secures said laser inboard of said distal end, and projects said beam at an outward and downward projection angle forward of vertical.

10. The device of claim 1, wherein said projecting means secures said laser near said distal end and comprises:

automatic actuating means operatively connected to said laser for actuating said beam in said projection region at a sufficient frequency to produce a virtual line image within said projection region.

11. The device of claim 1, wherein said projecting means secures said laser near said distal end and comprises:

manual actuating means operatively connected to said laser to enable the user to move said beam to produce an image within said projection region.

12. A device for indicating clearance requirements of an airplane maneuvering on a surface, said airplane having a linear axis and wings, each wing having a distal end, said device comprising:

electromagnetic generation means for generating a high intensity, low diffusing electromagnetic beam, wherein said electromagnetic beam is in the visible light spectrum such that the beam produces a visible image upon an object within its path; and projecting means for securing said electromagnetic generation means to said airplane and projecting said beam toward a projection region, said projection region corresponding to the clearance requirements of said distal end and extending from said surface upward, and wherein said projection region extends axially and in alignment with said distal end, and wherein said projection means secures said electromagnetic generation means near said distal end, and projects said beam at a downward projection angle forward of vertical.

13. The device of claim 12, wherein electromagnetic beam is a laser.

14. The device of claim 13, wherein said projecting means secures said laser near said distal end and comprises:

automatic actuating means operatively connected to said laser for actuating said beam in said projection region at a sufficient frequency to produce a virtual line image within said projection region.

15. The device of claim 12, wherein said projecting means comprises:

manual actuating means operatively connected to said electromagnetic generation means to enable the user to move said beam to produce an image within said projection region.

* * * * *